(12) United States Patent
Masal et al.

(10) Patent No.: US 12,501,391 B2
(45) Date of Patent: Dec. 16, 2025

(54) SYSTEM AND METHOD OF POSITIONING OF A TARGET NODE IN SIDE-LINK COMMUNICATION SYSTEM

(71) Applicants: Centre of Excellence in Wireless Technology, Tamil Nadu (IN); Indian Institute of Technology Madras (IIT Madras), Tamil Nadu (IN)

(72) Inventors: Abhijeet Abhimanyu Masal, Tamil Nadu (IN); Pavan Kalyan Devarakonda, Tamil Nadu (IN); Vikram Singh, Tamil Nadu (IN); Jeniston Deviraj Klutto Milleth, Thiruvallur (IN); Bhaskar Ramamurthi, Tamil Nadu (IN)

(73) Assignees: Centre of Excellentce in Wireless Technology, Chennai (IN); Indian Institute of Technology Madras, Chennai (IN)

( * ) Notice: Subject to any disclaimer, the term of this patent is extended or adjusted under 35 U.S.C. 154(b) by 354 days.

(21) Appl. No.: 18/181,650

(22) Filed: Mar. 10, 2023

(65) Prior Publication Data
US 2023/0292278 A1 Sep. 14, 2023

(30) Foreign Application Priority Data
Mar. 10, 2022 (IN) .............................. 202241013147

(51) Int. Cl.
*H04W 64/00* (2009.01)
*H04L 5/00* (2006.01)
*H04W 92/18* (2009.01)

(52) U.S. Cl.
CPC ........... *H04W 64/00* (2013.01); *H04L 5/0051* (2013.01); *H04W 92/18* (2013.01)

(58) Field of Classification Search
CPC ...... H04W 64/00; H04W 92/18; H04L 5/0051
See application file for complete search history.

(56) References Cited

U.S. PATENT DOCUMENTS

| 2012/0184253 | A1* | 7/2012 | Hsu | ........................ H04W 4/00 455/414.1 |
| 2022/0015057 | A1 | 1/2022 | Bao et al. | |
| 2022/0322274 | A1* | 10/2022 | Keating | ................ H04W 64/00 |

FOREIGN PATENT DOCUMENTS

| WO | 2021133104 A1 | 7/2021 | |
| WO | WO-2023072361 A1 * | 5/2023 | ........... G01S 5/0205 |

OTHER PUBLICATIONS

Examination Report for Indian Appl. No. 202241013147 dated Feb. 1, 2024, with English translation.

* cited by examiner

*Primary Examiner* — Joshua L Schwartz
(74) *Attorney, Agent, or Firm* — Merchant & Gould P.C.; Daniel R. Evans

(57) ABSTRACT

A method of positioning a target node (204-5) in a side-link communication system in a wireless communication network (200) is described. The method comprises establishing a communication link with the target node (204-5), and a second node (204-3), for positioning the target node (204-5). The first node (204-1) transmits a capability request message to the target node (204-5) and the second node (204-3) and receives a feedback message comprising a capability reply message and an acceptance message. The first node (204-1) configures the second node (204-3) for transmitting and receiving a Positioning Reference Signal (PRS) to or from the target node (204-5), based on the feedback message. The PRS is utilized for determining position measurement of the target node (204-5). The first node (204-1) receives data related to the position measurement and estimated position (Continued)

of the target node (204-5), from the target node (204-5) and the second node (204-3).

46 Claims, 9 Drawing Sheets

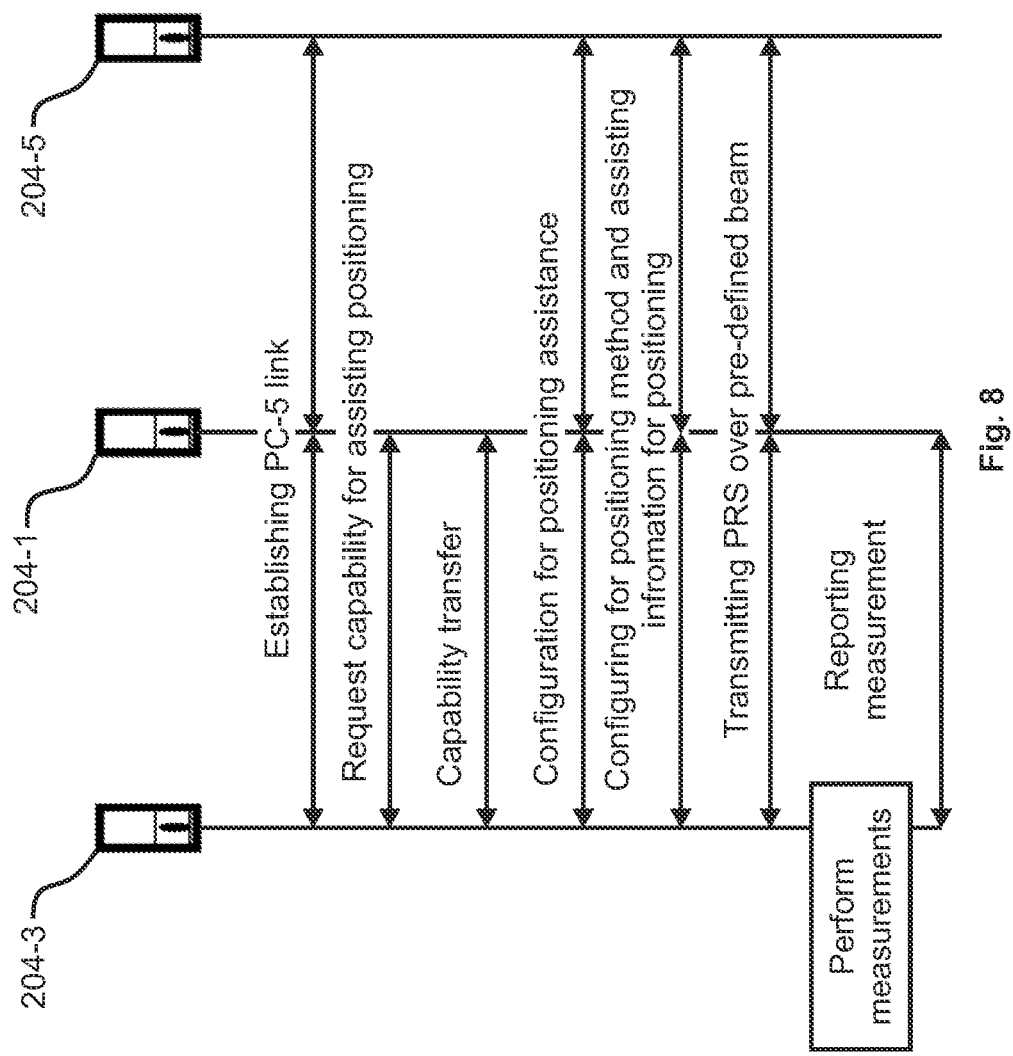

SYSTEM AND METHOD OF POSITIONING OF A TARGET NODE IN SIDE-LINK COMMUNICATION SYSTEM

FIELD OF THE INVENTION

The present invention relates to side-link communication in a wireless communication system, and more particularly to methods and signalling to support positioning of a target node in a side-link communication system.

BACKGROUND OF THE INVENTION 5G technology supports a large number of verticals including side-link communication which includes vehicle-to-vehicle (V2V), vehicle-to-everything (V2X), etc. To enhance the performance of side-link communication, positioning support plays a vital role, due to its wide range of business applications. Emergency call positioning emerges as an important use case due to regulatory requirements from the Federal communications commission (FCC). Many other critical services may rely on positioning as well, with much stricter requirements on accuracy, time to first fix, and latency. Third generation partnership project (3GPP), as well as other standard-bearing organizations, have focused on providing an accurate positioning measurement of User Equipment (UE). 3GPP technology, such as Long-Term Evolution (LTE), LTE-Advanced, and 5G/New Radio (NR) place increased importance on the sub-meter positioning accuracy of the UE. Increasing the positioning accuracy of a UE helps is protecting Vulnerable Road Users (VRUs), such as pedestrians, wheelchairs, and cyclists from vehicles, specifically autonomously driving vehicles. Protection of VRUs may require accurate side-link positioning when a UE is not connected to Base Stations (BSs) or required network coverage is not available.

In 5G system, positioning may be supported as a service, and methods such as, DL-Time Difference Of Arrival (DL-TDOA), enhanced cell-ID (E-CID), Observed Time Difference of Arrival (OTDOA), Uplink Angle of Arrival (UL-AoA), Uplink Relative Time of Arrival (ULRTOA), Uplink Time Difference of Arrival (UL-TDOA), Multi-Round Trip Time (M-RTT), etc. are generally utilized. Further, in 5G system, architecture enhancement for positioning support and special positioning-related protocols such as, LTE Positioning Protocol (LPP), NR Positioning Protocol Annex (NRPPa) and LTE Positioning Protocol Annex (LPPa) have been introduced.

In 5G/LTE, the positioning of a target UE is triggered based on the request made to an Location Management Function (LMF) server present in a Core Network (CN) and interfaced with the Next Generation Radio Access Network (NG-RAN) via. Access and mobility Management Function (AMF). This request may be generated by one of the networks, a target UE, or any external agent. LMF interacts with AMF and NG-RAN via standard interfaces NLs and NRPPa (Nls-NG-C-), respectively. The server terminates at the UE through LPP protocol, which is transparent to NGRAN. The NRPPa and LPP enable the exchange of necessary information elements between NG-RAN, the UE, and the server, respectively. The 5G positioning architecture allows positioning a target UE based on NG-eNB via LPP (RRC) protocol for NSA mode. The UE and NG-RAN perform measurements with respect to each other over NR-Uu and LTE-Uu for gNB-TRPs and ng-eNB-TPs in NSA and SA modes, respectively.

For DL-based positioning, the LMF may provide configurations to the NG-RAN for transmission (or broadcasting) of reference signals and to target UE for measuring the reference signals. Similarly, for UL-based positioning, the LMF may provide resource configurations to the target UE for transmission (or broadcasting) of reference signals and to NG-RAN for measuring the reference signals. The resource configurations may be provided to the transmitter to indicate the parameters for generation and transmission of reference signals (RS), repetition/periodicity of RS resource sets, transmission filters, and transmission frequency bands, etc. The resource configurations for the receiver may contain RS-IDs, measurement windows, measurement gaps, frequency bands, receive filters, etc.

accordance with prior art. FIG. 1A illustrates DL-PRS resource allocation with COMB-12 multiplexing six base stations for positioning of a target UE, in accordance with prior art. FIG. 1B illustrates UL-SRS resource allocation with COMB-4 for positioning of a target UE, in accordance with prior art. A COMB factor and RE-Offset may allow a receiver node to receive from multiple transmitters simultaneously on orthogonal resources in the time and frequency domain. The resources (RS) may be used by the receiver node to perform the measurements required for positioning the target UE. These measurements can be one or multiple of time (difference) of arrival, angle of arrival, RS received power, and angle of departure. In UL/DL-TDoA, m-RTT, UL-AoA, DLAoD, and ECID methods. The receiver may estimate the position of the target UE based on one or multiple of the RS time difference (RSTD), RTT, AoA, AoD, and estimates the RS received power (RSRP) based on measurements reported by UE and RAN. Table 1 illustrates various methods supported by release-16 standards in 5G-NR.

TABLE 1

| Methods | UE Measurements | RAN measurements | LMF |
| --- | --- | --- | --- |
| ULTDoA | — | RSTD | Estimate position based on RSTD |
| DLTDoA | RSTD from multiple BSs | — | Estimate position based on RSTD |
| m-RTT | RTT | — | Estimate position based on RTT |
| UL-AoA | — | AoA | Estimate position based on AoA |
| DL-AoD | RSRP/beam | Beam information | Estimate AoDs and use them to estimate the position |
| ECID | RSRP/beam | TA and B-RSRP | Estimate ToAs, AoDs and use them to estimate the position |

Side-link link positioning may be visualized as co-operative localization. In the cooperative localization paradigm, nodes may include master nodes such as, a BS, a relay node, a Non-terrestrial BS, and slave nodes such as, UE, V2X UEs, etc. Such nodes assists each other for improving coverage and positioning with improved accuracy. In 5G system, more than one BS (also termed as gNB, eNB, etc.) may be configured to perform one of the measurements mentioned in Table 1 and LMF may collect all measurements from all the BSs to estimate most accurate positioning of a UE.

Accuracy of the positioning may increase with the availability of more than one assisting node. Geometric dilution of precision (GDOP) is an important problem in positioning that negatively affect the positioning accuracy when the target UE position is at one of the edges of the triangle, or even crosses the edge, and anchor UEs acts as the different vertex of the triangle. The effect of GDOP which occurs because of geometry, may decrease when target UE moves towards the center of the triangle.

Thus, there is a need of a method of positioning of the target UE in NR side-link communication, which address the above-mentioned shortcomings of the conventional methods of positioning of the target UE.

OBJECTS OF THE INVENTION

A general objective of the present invention is to provide methods of positioning of a target UE in the side-link communication.

Another objective of the present invention is to provide architecture for side-link positioning for three different scenarios and the signaling solutions for the proposed architectures.

Still another objective of the present invention is to provide time based methods and angle based methods for positioning of a target UE, and provides the specific signaling modifications for the time based and angle based methods.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention relates to method of positioning a target node in a side-link communication system. The method comprises establishing, by at least one first node, a communication link with at least one target node, and at least one second node, for positioning the at least one target node. The method further comprises transmitting, by the at least one first node, a capability request message to at least one of the at least one target node and the at least one second node. The method further comprises receiving, by the at least one first node, a feedback message from the at least one target node and the at least one second node, wherein the feedback message comprises at least one of a capability reply message and an acceptance message. The method further comprises configuring, by the at least one first node, the at least one second node to one of transmit at least one Positioning Reference Signal (PRS) to the at least one target node and receive the at least one PRS from the at least one target node, based on the feedback message, wherein the at least one PRS is utilized for determining a data related to at least one of position measurement and estimated positioning of the at least one target node. The method comprise receiving, by the at least one first node, a data related to at least one of a position measurement and estimated position of the at least one target node used to estimate a position information, from at least one of the at least one target node and the at least one second node.

In an aspect, prior to establishing the communication link by the at least one first node. The method further comprises receiving, by the at least one first node, a request from one of the at least one second node, the at least one target node, a Location Request Control Unit (LRCU), external application connected to the at least one first node, a sidelink positioning server and a Location Management Function (LMF), for establishing the communication link.

In an aspect, the sidelink positioning server performs a subset of the functionalities of the LMF.

In an aspect, the method further comprising estimating, by the at least one first node, the position information of the at least one target node based on the data related to the position measurement and transmitting, by the at least one first node, the position information of the at least one target node to at least one of the LRCU, the LMF, the at least one target node, and the at least one second node.

In an aspect, receiving by at least one first node, the data related to estimated position of the at least one target node further comprises transferring, by the at least one first node, the estimated position of the at least one target node to a LMF via an Access and Mobility Management Function (AMF).

In an aspect, the method further comprises transferring, by the at least one first node, the data related to the position measurement of the at least one target node to a LMF, and estimating, by the LMF, the position information of the at least one target node.

In an aspect, the position information is at least one of the relative position, absolute position, directional ranging, and distance ranging of the at least one target node.

In an aspect, the relative position of the at least one target node is estimated with respect to one of the at least one first node, the at least one second node and node containing the sidelink positioning server, the absolute position of the at least one target node is estimated with respect to one of global coordinate system (GCS) and a local coordinate system (LCS) configured to the at least one target node, wherein the direction ranging is the direction of the at least one target node with respective to one of the at least one first node, the at least one second node and a node containing the sidelink positioning server, and wherein the distance ranging is the distance of the at least one target node with respective to one of the at least one first node, the at least one second node and the node containing the sidelink positioning server.

In an aspect, the method further comprises transferring, by the at least one first node, the estimated position to a sidelink positioning server via the LRCU when the at least one first node, the at least one second node and the at least one target node are not connected to at least one base station (BS).

In an aspect, at least one of the at least one first node, the at least one second node, and the at least one target node performs the functionality of sidelink positioning server and the LRCU.

In an aspect, the capability reply message comprises at least one of message segmentation capability, PRS processing capability, maximum frequency layer supported, sidelink band combination supported, supported bandwidth, supported Sub-Carrier Spacing (SCS), PRS processing duration, maximum PRS configuration can be handled, FR1/FR2 support, PRS buffer types, a list of the at least one second node, and Quasi Co Location (QCL) capabilities.

In an aspect, receiving, by the at least one first node, the feedback message from the at least one second node further comprises deciding by the at least one first node, an at least one second node for the position measurement of the at least one target node, and wherein the feedback message further comprises at least one of overlapping positioning capabilities, link quality, signal strength, relative or absolute location of the node, battery life of node, node type, node power class, and node security criteria, and PC5 capability.

In an aspect, the at least one second node is decided from a list of assisting nodes received from at least one of the at least one target node, the external application, the positioning server, and LCRU.

In an aspect, configuring, by the at least one first node, the at least one target node and the at least one second node further comprises performing the position measurement based on an assistance information, and wherein the assistance information comprises physical cell IDs (PCIs), global cell IDs (GCIs), second node IDs, reference node, second node locations, local positioning reference, global positioning reference, synchronization offsets between the at least one target node and at least one second node, set of PRS configurations, set of reporting configurations, periodic or aperiodic measurement reporting information, trigger for measurements, time window for measurement, time stamp of the measurement, and integrity protection parameter for measurements.

In an aspect, configuring, by the at least one first node further comprises transmitting, by the at least one first node, a location information request to the at least one target node and the at least one second node, wherein the location information request comprises measurement quality, expected PRS resource configuration, a container for reporting the measurement values or positioning estimate, timestamp for measurement, and time window for a response.

In an aspect, the method further comprises receiving by the at least one first node, a positioning measurement from at least one of the at least one target node and the at least one second node in response to the location information request; wherein the positioning measurement comprises the data related to at least one of the position measurement and the estimated position of the at least one target node.

In an aspect, the at least one PRS is at least one of side-link Synchronization Signal Block (SL-SSB), side-link Demodulation Reference Signal (DMRS), side-link Channel State Information Reference Signal (CSI-RS), and Sounding Reference Signal (SRS).

In an aspect, the positioning is performed using at least one of a side-link time difference of arrival (SL-TDOA) positioning method, a side-link multiple round trip time (SL-mRTT) positioning method, a side-link angle of arrival (SL-AoA) positioning method, a side-link angle of departure (SL-AoD) positioning method, carrier phased based positioning (CPP) method, zone ID, and assisted Global Navigation Satellite System (GNSS) positioning method.

In an aspect, the SL-TDOA positioning method comprises measuring, by at least one of the at least one target node and at least one second node, at least one of a reference signal time (RST), a reference time of arrival (RTOA), and reference signal time difference (RSTD) based on the at least one PRS sequence.

In an aspect, the RSTD is a difference between RST of the at least one second node and RST of the at least one target node and wherein the RTOA is a difference between RST and a reference time pre-configured.

In an aspect, the at least one target node measures at least one of an angle of arrival (AoA), Reference Signal Received Power (RSRP), line of sight (LOS) probability, and timestamp corresponding to each RSTD/RST.

In an aspect, the SL-m-RTT positioning method comprises transmitting, by the at least one second node, at least one first PRS sequence in a preconfigured PRS resource to the at least one target node at a first time instant, receiving, by the at least one second node, at least one second PRS sequence from the target node at a second time instant and measuring, by at least one of the at least one target node and the at least one second node, a difference between transmission time at the first time instant and reception time at the second time instant for determination of a Round Trip Time (RTT) in terms of at least one of a Rx-Tx time difference of arrival, a Rx-Rx time difference of arrival, and a Tx-Tx time difference of arrival.

In an aspect, the at least one first node performs positioning of the at least one target node based on the difference between the transmission time and the reception time, QCL assumptions, Transmission-Reception beam pair hypothesis, and RSRP of the difference between the transmission time and the reception time.

In an aspect, the AoA is measured by at least one of the at least one at least one target node and at least one second node based on at least one tap in a power delay profile (PDP) estimation and antenna parameters.

In an aspect, the antenna parameters comprise at least one of antenna spacing, antenna pattern, beamwidth, and antenna power per element.

In an aspect, the SL-AoD positioning method comprises power measurement from at least one of the at least one target node and at least one second node over at least one PRS transmitted using at least one beam, wherein the power measurement is performed based on Reference Signal Received Power (RSRP), Received Signal Strength Indicator (RSSI), and Signal to Noise Ratio (SNR).

In an aspect, at least one of the at least one target node and at least one second node sweeps a spatial dimension in Zenith and Azimuth direction with redefined angles based on at least one of a number of antennas, antenna type, bore sight, beam width, and beamforming capability.

In an aspect, the at least one second node and at least one target node are configured in a complementary direction to receive the PRS over side-link.

In an aspect, the CPP positioning method comprises measuring, by at least one of the at least one target node and the at least one second node, a carrier phase of the at least one PRS received over at least one of single sub carrier, multiple sub carrier, over a bandwidth part and a carrier bandwidth.

In an aspect, the at least one first node is configured to one of transmit the at least one PRS to the at least one target node and receive the at least one PRS from the at least one target node and acquire the data related to at least one of the position measurement and the estimated position of the at least one target node.

The present invention further describes a method of positioning a target node in a sidelink communication system. The method comprises transmitting, by at least one target node, a request for position measurement to at least one first node, performing one of: receiving, by the at least one target node, at least one Positioning Reference Signal (PRS) from at least one of the at least one first node and at least one second node, transmitting, by the at least one target node, the at least one PRS to one of the at least one first node and at least one second node, wherein the at least one second node is selected from a list of assisting nodes, and estimating, by the at least one target node, a data related to at least one of position measurement and estimated positioning based on the at least one PRS.

In an aspect, the list of assisting nodes are capable of performing position measurement of the at least one target node.

In an aspect, the method further comprises transmitting, by the at least one target node (204-5), the data related to at least one of position measurement and estimated positioning to at least one of a sidelink positioning server, the at least one first node and at least one second node.

In an aspect, the least one of the at least one first node and at least one second node transfers the data related to the at least one of position measurement and the estimated positioning to the sidelink positioning server.

In an aspect, the data related to at least one of position measurement and estimated positioning is transmitted to a Location Management Function (LMF) via an Access and Mobility Management Function (AMF).

In an aspect, the data related to at least one of position measurement and estimated positioning is transmitted to a Location Request Control Unit (LRCU) when the at least one first node, the at least one second node and the at least one target node are not connected to at least one base station (BS).

In an aspect, the at least one PRS is at least one of side-link Synchronization Signal Block (SL-SSB), side-link Demodulation Reference Signal (DMRS), side-link Channel State Information Reference Signal (CSI-RS), and Sounding Reference Signal (SRS).

In an aspect, the positioning is performed using at least one of a side-link time difference of arrival (SL-TDOA) positioning method, a side-link multiple round trip time (SL-mRTT) positioning method, a side-link angle of arrival (SL-AoA) positioning method, a side-link angle of departure (SL-AoD) positioning method, zone ID, carrier phase based positioning (CPP) method and assisted Global Navigation Satellite System (GNSS) positioning method.

In an aspect, the SL-TDOA positioning method comprises measuring, by at least one of the at least one target node and at least one second node, at least one of a Reference Signal Time (RST) a reference time of arrival (RTOA) and Reference Signal Time Difference (RSTD) based on the at least one PRS sequence.

In an aspect, the RSTD is a difference between RST of the at least one second node (204-3) and RST of the at least one target node (204-5) and wherein the RTOA is a difference between RST and a reference time pre-configured.

In an aspect, the at least one target node measures at least one of an angle of arrival (AoA), Reference Signal Received Power (RSRP), line of sight (LOS) probability, and timestamp corresponding to each RSTD/RST.

In an aspect, the SL-m-RTT positioning method comprises transmitting, by the at least one second node, at least one first PRS sequence in a preconfigured PRS resource to the at least one target node at a first time instant, receiving, by the at least one second node, at least one second PRS sequence from the target node at a second time instant and measuring, by at least one of the at least one target node and the at least one second node, a difference between transmission time at the first time instant and reception time at the second time instant for determination of a Round Trip Time (RTT) in terms of at least one of a Rx-Tx time difference of arrival and a Rx-Rx time difference of arrival and a Tx-Tx time difference of arrival.

In an aspect, the at least one first node performs positioning of the at least one target node based on the difference between the transmission time and the reception time, QCL assumptions, Transmission-Reception beam pair hypothesis, and RSRP of the difference between the transmission time and the reception time.

In an aspect, the AoA is measured by at least one of the at least one at least one target node and at least one second node based on at least one tap in a power delay profile (PDP) estimation and antenna parameters.

In an aspect, the antenna parameters comprise at least one of antenna spacing, antenna pattern, beamwidth, and antenna power per element.

In an aspect, the SL-AoD positioning method comprises performing power measurement from at least one of the at least one target node and at least one second node over at least one PRS transmitted over at least one beam, wherein the power measurement is performed based on Reference Signal Received Power (RSRP), Received Signal Strength Indicator (RSSI), and Signal to Noise Ratio (SNR).

In an aspect, at least one of the at least one target node and at least one second node sweeps a spatial dimension in Zenith and Azimuth direction with redefined angles based on at least one of a number of antennas, antenna type, bore sight, beam width, and beamforming capability.

In an aspect, the at least one second node and at least one target node are configured in a complementary direction to receive the PRS over side-link.

In an aspect, the CPP positioning method comprises measuring, by at least one of the at least one target node (204-5) and the at least one second node (204-3), a carrier phase of the at least one PRS received over at least one of single sub carrier, multiple sub carrier, over a bandwidth part and a carrier bandwidth.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 8 illustrates a signaling diagram of a second method of positioning of a target UE, in accordance with an embodiment of the present invention.

DETAILED DESCRIPTION OF THE INVENTION

Figure 1A:
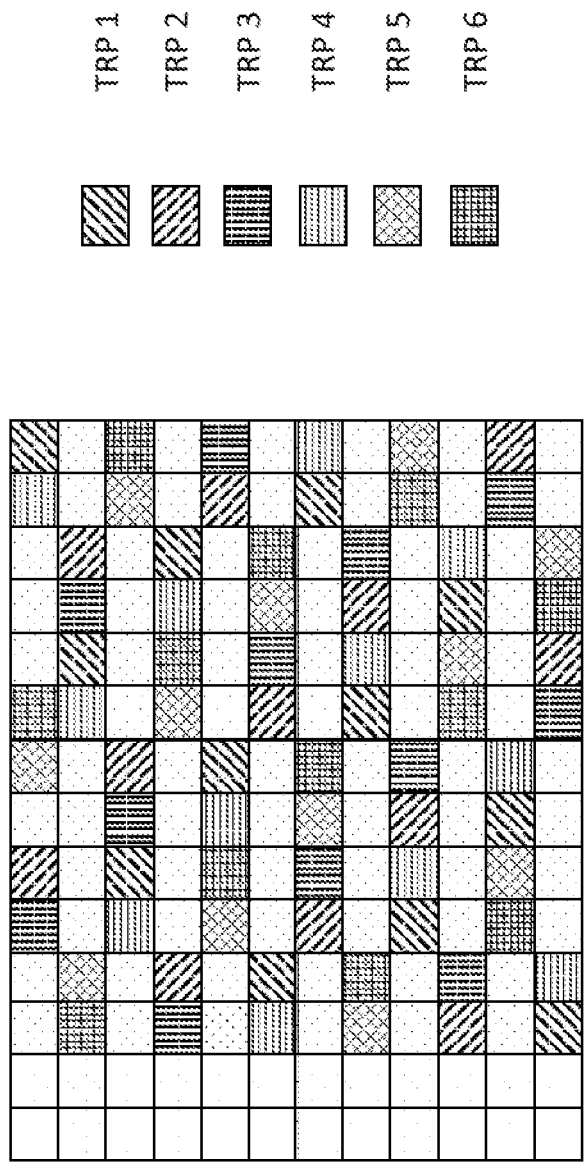
FIG. 1A illustrates DL-PRS resource allocation with COMB-12 multiplexing six base stations for positioning of a target UE, in accordance with prior art.
Figure 1B:
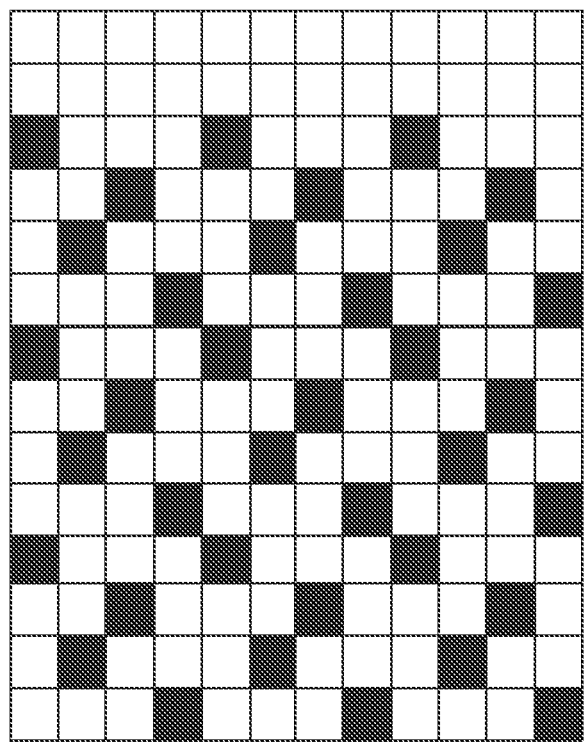
FIG. 1B illustrates UL-SRS resource allocation with COMB-4 for positioning of a target UE, in accordance with prior art.

As used in the description herein and throughout the claims that follow, the meaning of "a," "an," and "the"

includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present invention may provide methods of positioning for three different scenarios in the side-link communication. In scenario 1, the position of the target UE may be limited by its coverage with a Base Station (BS). In this case, the BS must find the devices nearby the target node. The neighbour UEs may be selected based on the line of sight (LOS) link, Doppler/mobility, distance from the target device, UE capability, status-busy/idle, etc. Further, the BS must know an estimate of the location of assisting nodes must be known. In this scenario, the target UE and all assisting UEs may be in the direct or indirect coverage of the associated BS node. If the target UE is in indirect coverage, it may be connected to neighbouring BS and master BS may communicate with the connected neighbouring BS. In scenario 2, the target UE is out of coverage but can connect to the BS via a UE relay. In this case, the UE relay may act as a routing node and send the messages from the BS node to the target node and vice versa. In scenario 3, the neither of the target UE, assisting UE nor the UE relay may be in the coverage of any BS.

The UE relay also called as an anchor UE may be responsible for handling the positioning requests from all the assisting or target UEs. The anchor UE may identify the target UEs and their neighbouring UEs which acts as assisting UEs. The anchor UE may provide resource allocation for positioning and may be responsible for orthogonality in resource allocation between different UEs. The anchor UE may establish the connection with assisting and target UEs for positioning. These connections may facilitate the exchange of capabilities, assistance information, positioning measurements, and reporting resources between target UEs and assisting UEs. This may be equivalent to the location management function (LMF) in LTE and NR.

The assisting UEs may be a group of UEs that lie in the neighbourhood of the target UEs and are involved by the anchor UE for assistance in the localization of target UEs. The direction of transmission of neighbouring UEs and target UE may be complementing to each other. For instance, if the positioning method invoked is DL-TDOA, then target UE may be in downlink mode to receive the positioning reference signal and assisting UEs may be configured in uplink mode to transmit the positioning reference signal, and vice-versa in the case of UL-TDOA. The target UE may support the positioning through side-link using reference signals. The position of the target UE may be estimated based on measurements performed on reference signals. The target UE may have the capability to estimate positioning using the measurements.

Figure 2:
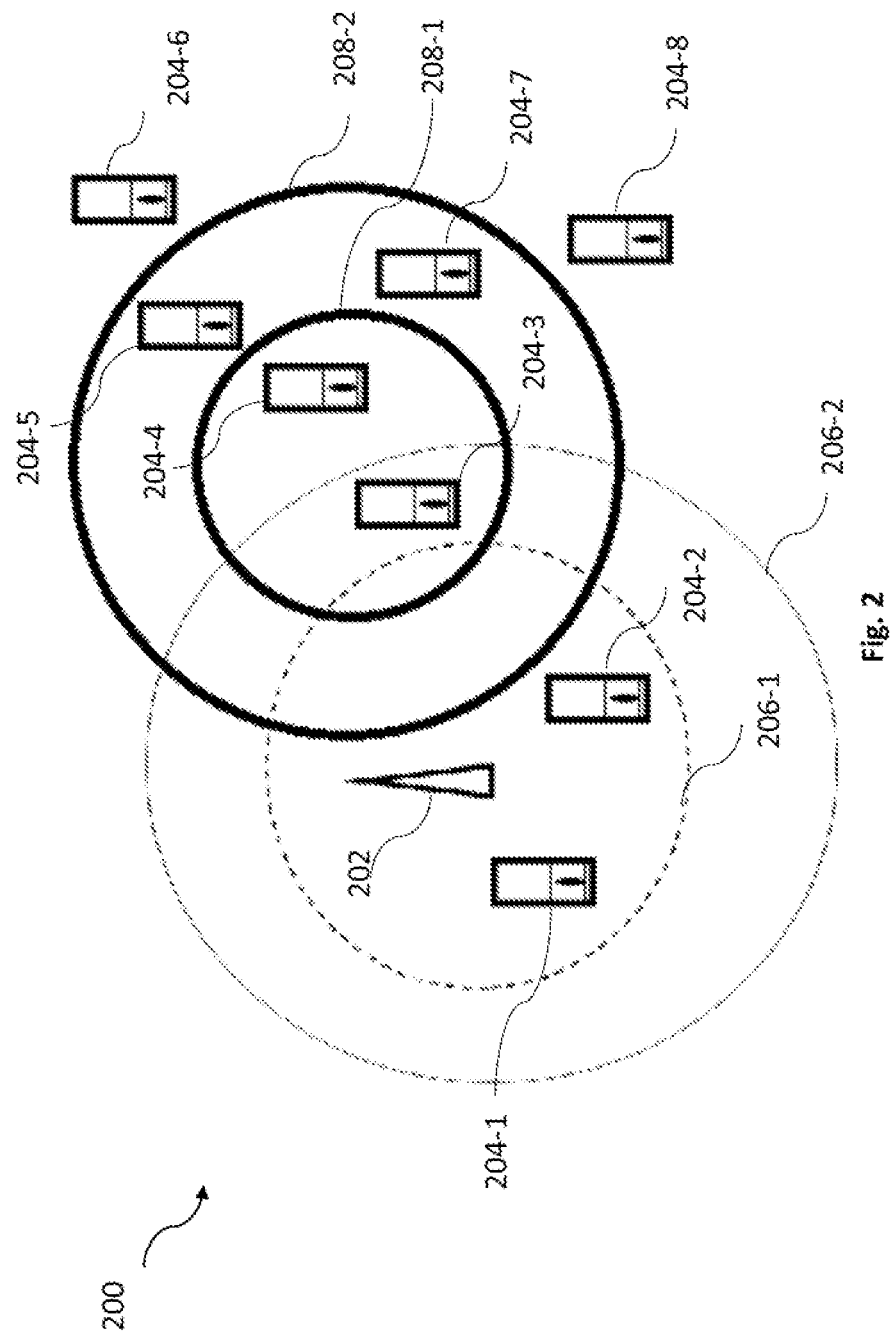
FIG. 2 illustrates a network diagram of a wireless communication network, in accordance with an embodiment of the present invention.

FIG. 2 illustrates network diagram of a wireless communication network 200, in accordance with an embodiment of the present invention. The wireless communication network 200 may comprise a Base Station (BS) 202 and User Equipment (UEs), such as a first UE 204-1 through $n^{th}$ UE 204-n. The first UE 204-1 through $n^{th}$ UE 204-n are cumulatively referred as a UE 104 for the ease of labelling and explanation. The BS 202 may communicate with the UE 204. The UE 204 may be either stationary or mobile and may be dispersed throughout the wireless communication network 200. The wireless communication network 200 may be divided into regions 206-1, 206-2, 208-1 and 208-2. The UE 204-1 and UE 204-2 may lie in the region 206-1. The UE 204-3 to UE 204-6 may lie in the region 208-1 and 208-2.

Figure 3:
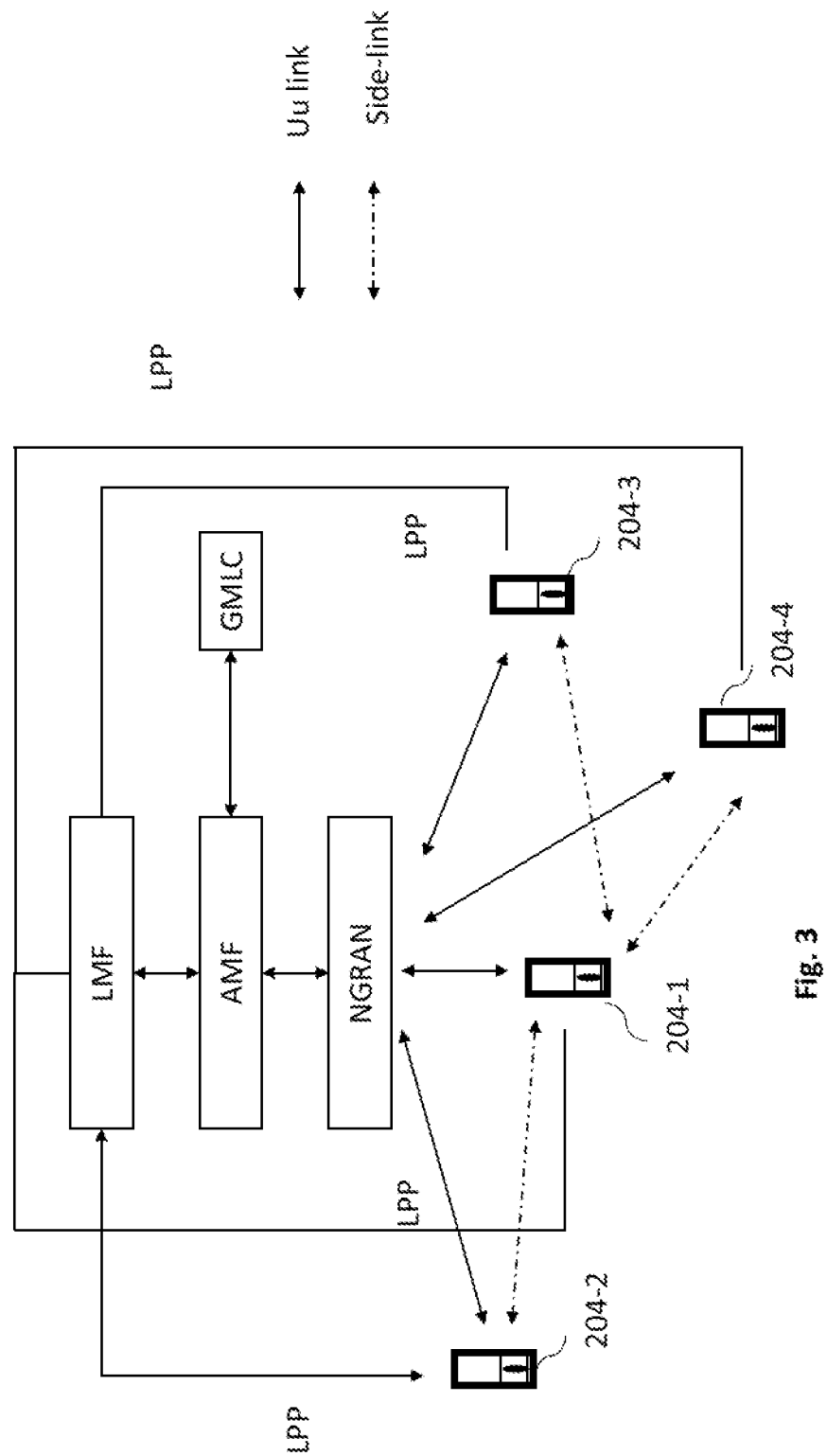
FIG. 3 illustrates an architecture for scenario 1 where a Base Station (BS) manages the positioning of a target UE, in accordance with an embodiment of the present invention.

FIG. 3 illustrates an architecture for scenario 1 where the BS manages the positioning of the target UE, in accordance with an embodiment of the present invention. In scenario 1, a Location Management Function (LMF) may be connected to the BS 202 through an Access and Mobility Management Function (AMF). The BS 202 may communicate with LMF using NR Positioning Protocol Annex (NRPPa) or LTE Positioning Protocol Annex (LPPa). LMF may be communicating with the target UE 204-4 and the assisting UEs 204-2 and 204-3 using LTE Positioning Protocol (LPP). The BS 202 may assist the LMF to search and select at least one assisting UE 204-3 for co-operative localization. The assisting UE 204-3 may perform the measurements or transmit the Positioning Reference Signal (PRS) depending on the selected positioning method.

Figure 4:
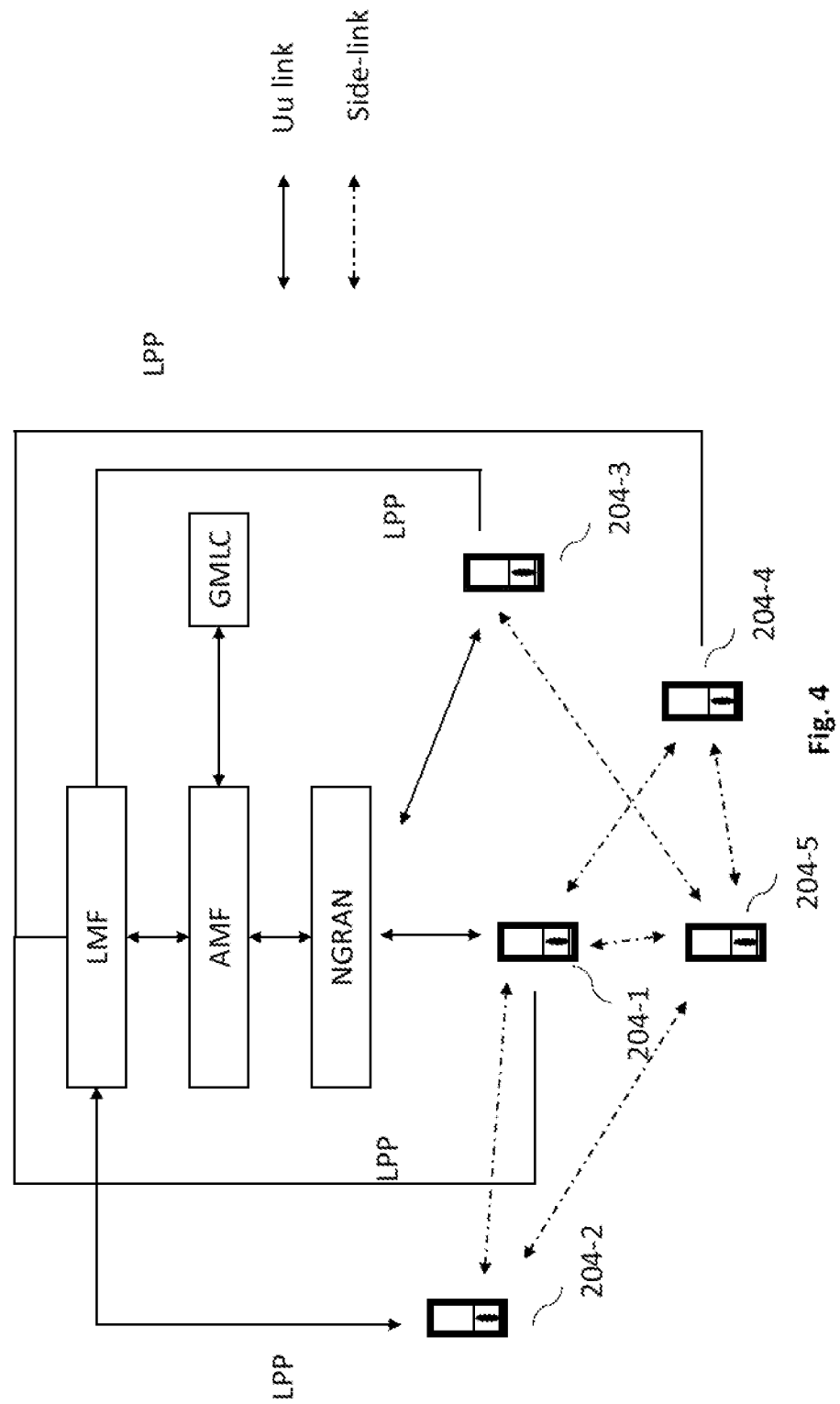
FIG. 4 illustrates an architecture for scenario 2 where the target UE is out of coverage, and connected to a BS via an anchor UE, in accordance with an embodiment of the present invention.

FIG. 4 illustrates an architecture for scenario 2 where the target UE 204-5 is out of coverage, and connected to the BS 202 via an anchor UE 204-1, in accordance with an embodiment of the present invention. In scenario 2, the target UE 204-5 may be connected with LMF through the BS 202 and the anchor UE 204-1. The anchor UE 204-1 may manage the signaling to and from the target UE 204-5 to the LMF. The anchor UE 204-1 may carry the responsibility of finding at least one assisting UEs 204-2 to 204-4 in the neighborhood of the target UE 204-5 and reporting it to either BS or LMF directly.

Figure 5:
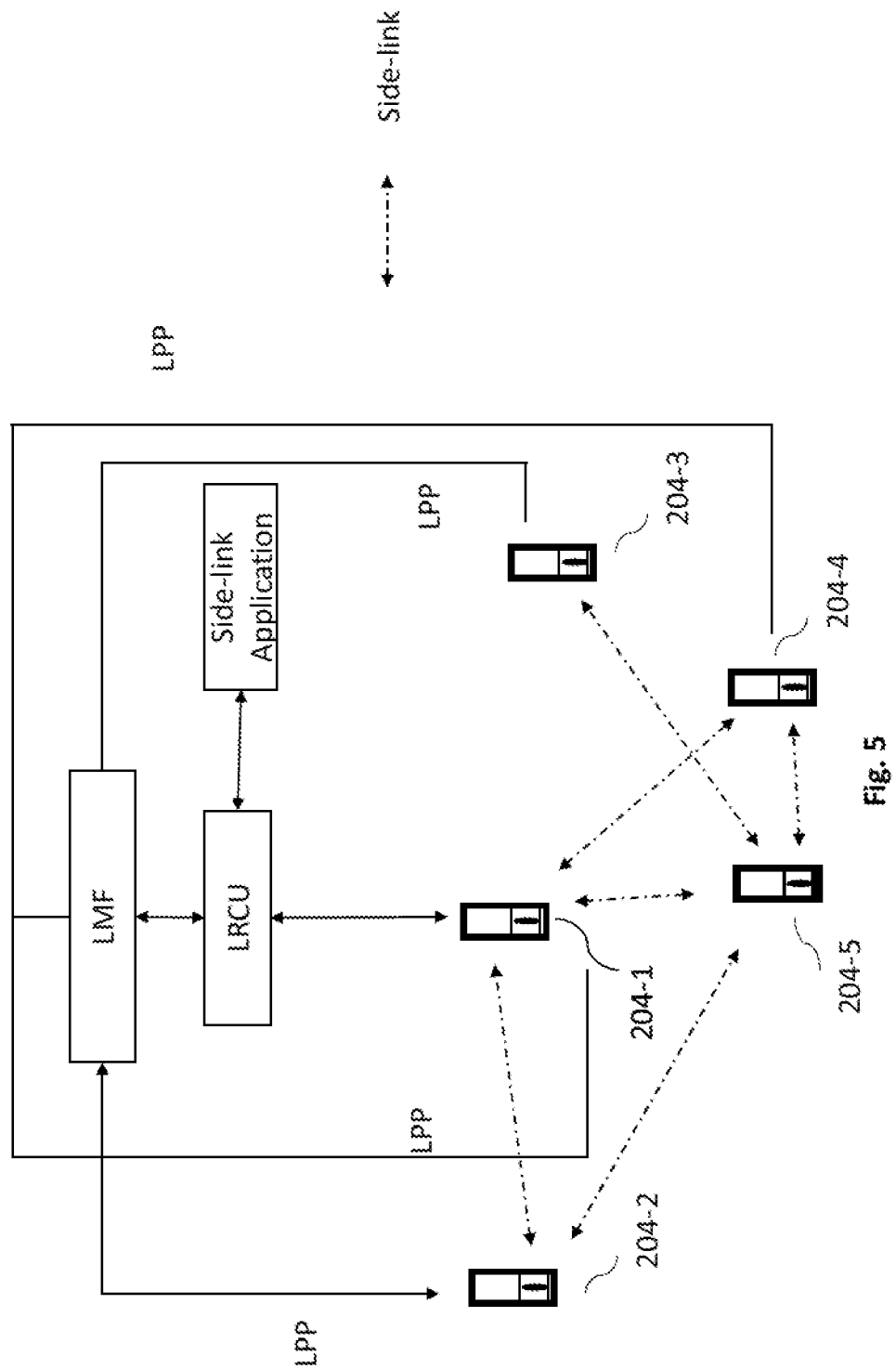
FIG. 5 illustrates an architecture for scenario 3 where a target UE and an anchor UE are not in network coverage of a BS, in accordance with an embodiment of the present invention.

FIG. 5 illustrates an architecture for scenario 3 where the target UE 204-5 and the anchor UE 204-1 are not in network coverage of the BS 202, in accordance with an embodiment of the present invention. In scenario 3, the target UE 204-5 may initiate the positioning request or any other UE in the vicinity may initiate the positioning request to the anchor node 204-1. The target UE 204-5 may search for the anchor node 204-1 and may submit the request for positioning when positioning is initiated by the target UE 204-5. If there may be multiple anchor UEs for positioning one target UE, the target UE may not be able to find a sufficient number of assisting UEs in the vicinity of target UE. In such a case, the anchor UE 204-1 may coordinate with other anchor UEs under the control of the LMF. The anchor UE 204-1 may be one of roadside unit (RSU), V2X UE, and any stationary UE with a known location. The anchor node 204-1 may have a location request control Unit (LRCU) which is connected with the side-link application server and LMF.

Figure 6:
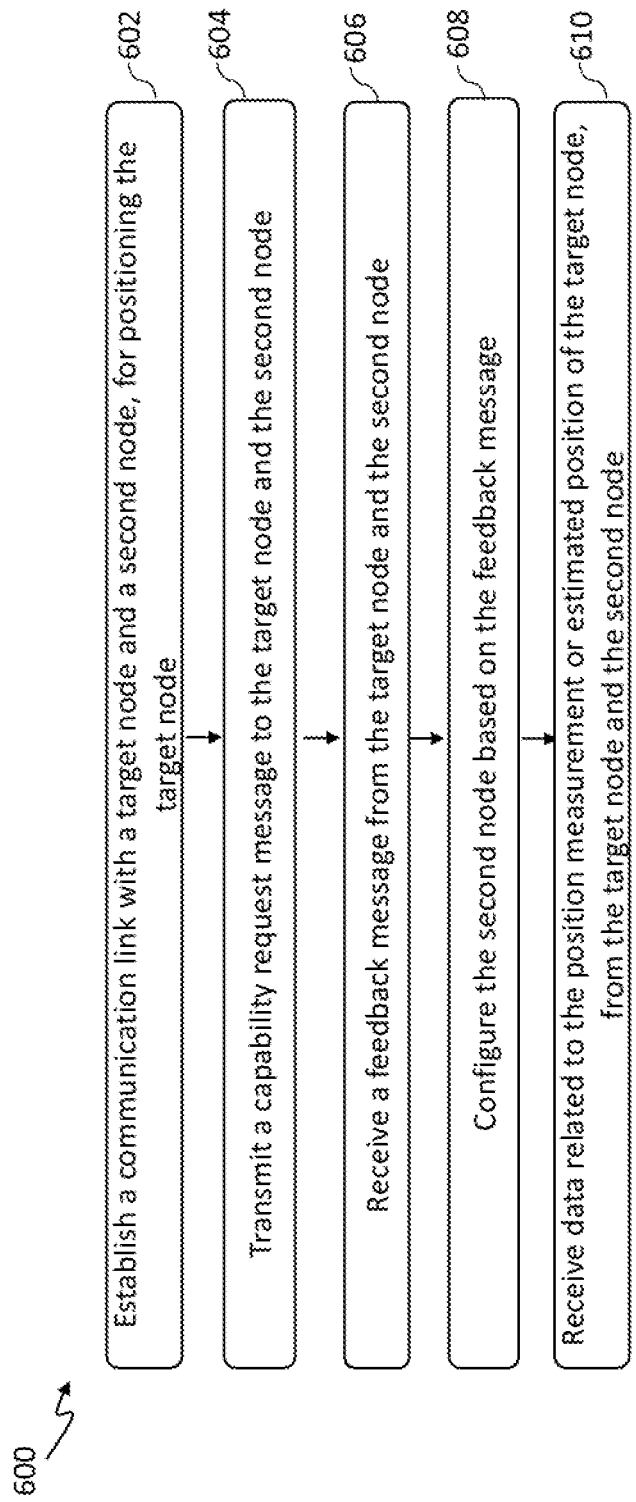
FIG. 6 illustrates a flow chart of a method of positioning a target node in a side-link communication system, in accordance with an embodiment of the present invention.

FIG. 6 illustrates a flow chart 600 of a method of positioning the target node in a sidelink communication system between the UEs 204 operating in the wireless communication network 200, in accordance with an embodiment of the present invention. It should also be noted that in some alternative implementations, the functions noted in the blocks may occur out of the order noted in the drawings. For example, two blocks shown in succession in FIG. 6 may in fact be executed substantially concurrently or the blocks may sometimes be executed in the reverse order, depending upon the functionality involved. Alternate implementations are included within the scope of the example embodiments in which functions may be executed out of order from that shown or discussed, including substantially concurrently or in reverse order, depending on the functionality involved.

In the wireless communication network 200, one of the UEs 204, such as the UE 204-1 may act as an anchor UE, one of the UEs 204, such as the UE 204-5 may act as a target UE and other UEs 204, such as the UE 204-2 to UE 204-4, UE 204-6 to UE 204-8 may act as assisting UEs. The anchor UE 204-1 may establish a communication link with the target UE 204-5 and the assisting UEs 204-2 to 204-4, at step 602. The communication link may be established for positioning of the target UE 204-5. The anchor UE 204-1 may transmit a capability request message to the target node 204-5 and the assisting UE 204-3, at step 604. The anchor UE 204-1 may receive a feedback message from the target UE 204-5 and the assisting UE 204-3, at step 606. The feedback message may comprise a capability reply message and an acceptance message. The anchor UE 204-1 may configure the assisting UE 204-3 based on the feedback message, at step 608. The assisting UE 204-3 may be configured for transmitting a Positioning Reference Signal (PRS) to the target UE 204-5 and for receiving the PRS from the target UE 204-5. In one implementation, the anchor UE 204-1 itself is configured for transmitting and receiving the PRS. The PRS may be utilized for determining a data related to position measurement and estimated positioning of the target UE 204-5. The anchor UE 204-1 may receive data related to the position measurement or estimated position of the target node 204-5, from one or more of the target node 204-5 and the second node 204-3, at step 610.

The position information may be at least one of the relative position, absolute position, directional ranging, and distance ranging of the target UE 204-5. The relative position of the target UE 204-5 may be estimated with respect to one of the first UE 204-1, the second UE 204-3 and node containing the sidelink positioning server. The absolute position of the target UE 204-5 may be estimated with respect to one of global coordinate system (GCS) and a local coordinate system (LCS) configured to the target UE 204-5. The direction ranging may be the direction of the target UE 204-5 with respective to one of the at least one first UE 204-1, the second UE 204-3 and the node containing the sidelink positioning server.

The anchor UE 204-1 may receive the request for positioning at the AMF/LCRU of the anchor UE 204-1. Upon receiving the request, the anchor UE 204-1 may request capability from the target UE 204-5. If the request is initiated by the target UE 204-5, then a capability reply message may be sent voluntarily by the target UE 204-5 along with positioning request. The capability reply message may comprise message segmentation capability, PRS processing capability, maximum frequency layer supported, side-link band combination supported, supported bandwidth, supported Sub-Carrier Spacing (SCS), PRS processing duration, maximum PRS configuration can be handled, FR1/FR2 support, PRS buffer types, and Quasi Co Location (QCL) capabilities.

The anchor UE 204-1 may set up PC5 link connection with the neighbouring assisting UEs. The anchor UE 204-1 may maintain a list of the assisting UEs as assisting A-UE-1, A-UE-2, through A-UE-N. The list may be updated based on the predefined geographical area, for example, predefined radius, zone, sector, etc. All the UEs within the predefined geographical area may act as possible assisting UEs for the anchor UE 204-1. Alternatively, the target UE 204-5 may provide a list of possible assisting UEs to the anchor UE 204-1.

The anchor UE 204-1 may send requests to all the neighbouring assisting UEs to act as an assisting UE for positioning of the target UE 204-5. The anchor UE 204-1 may receive the feedback containing the acceptance to become as an assisting UE and positioning capability information from the neighbouring assisting UEs. The anchor UE 204-1 may prepare a list of UEs accepting requests to become assisting UE and forward it to LMF.

The anchor UE 204-1 may select at least one assisting UE 204-3 from the list of UEs accepting the request to become assisting UE. The anchor UE 204-1 may configure the assisting UE 204-3 to perform positioning for the target UE 204-5 by selecting at least one method of positioning. The anchor UE 204-1 may select the assisting UE 204-3 based on the capability information received. The information may comprise overlapping positioning capabilities, link quality, signal strength, relative or absolute location of the assisting UE, battery life of the UE, UE type, UE power class, and UE security criteria.

The anchor UE 204-1 may select the method of positioning using one or more of a sidelink time difference of arrival (SL-TDOA) positioning method, a side-link multiple round trip time (SL-m-RTT) positioning method, a side-link angle of arrival (SL-AoA) positioning method, a sidelink angle of departure (SL-AoD) positioning method, carrier phased based positioning (CPP) method and zone ID and assisted global navigation satellite system (GNSS) positioning method.

Upon selecting the positioning method, the anchor UE 204-1 may configure the target UE 204-5 and the assisting UE 204-3 for the position measurement based on an assistance information. The assistance information may comprise physical cell IDs (PCIs), global cell IDs (GCIs), assisting UE IDs, reference assisting UE, assisting UE locations, local positioning reference, global positioning reference, synchronization offsets between the reference assisting UE and the assisting UE 204-3, set of PRS configurations, set of reporting configurations, periodic or aperiodic measurement reporting information, trigger for measurements, time window for measurement, time stamp of the measurement, and integrity protection parameter for measurements.

Figure 7:
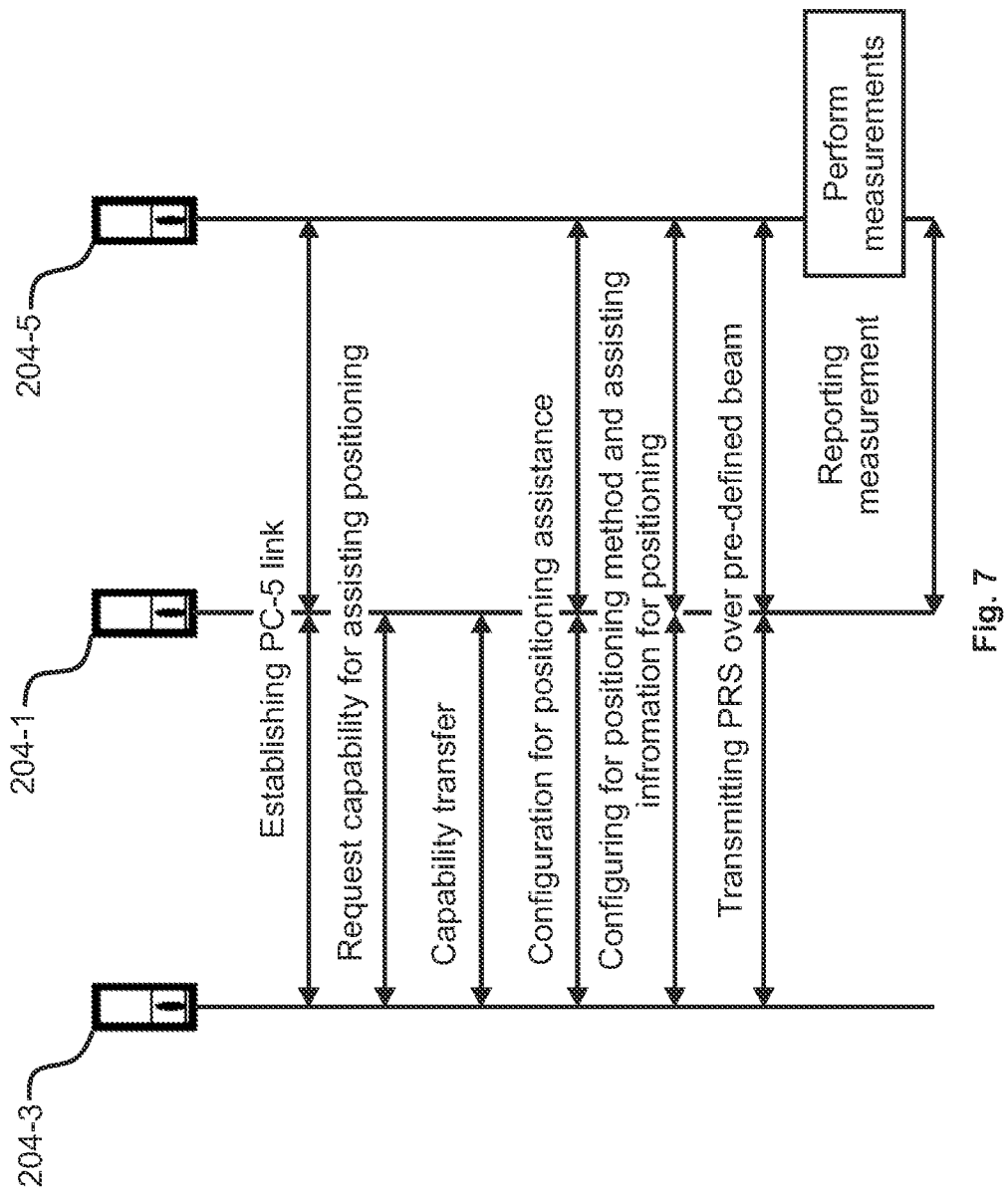
FIG. 7 illustrates a signaling diagram of a first method of positioning of a target UE, in accordance with an embodiment of the present invention.

FIG. 7 illustrates a signaling diagram of a first method of positioning of the target UE 205-5, in accordance with an embodiment of the present invention. The target UE 204-5 may be configured to perform measurement or estimation of positioning. The anchor UE 204-1 may transmit a location information request (requestLocationInfromation) message to the target UE 204-5 and the assisting UE 204-3. The location information request may comprise measurement quality, expected PRS resource configuration, a container for reporting the measurement values or positioning estimate, timestamp for measurement, and time window for a response.

The target UE 204-5 may initiate an assistance information request message to the anchor UE 204-1. The target UE 204-5 may perform the measurements on configured resources using the assistance information. After measurement or estimation, the target UE 204-5 may transmit the measurements as a response with provideLocationInformation message. The provide LocationInformation message may contain the measurements or estimate to be reported to the anchor UE 204-1. The target UE 204-5 may respond with the provideLocationInformation message within a predefined time window (before the timer expires).

FIG. 8 illustrates a signaling diagram of a second method of positioning of the target UE 205-5, in accordance with an embodiment of the present invention. The assisting UE 204-3 may be configured to perform measurement or estimation of positioning. The anchor UE 204-1 may transmit a location information request (requestLocationInfromation) message to the target UE 204-5 and the assisting UE 204-3. The location information request may comprise measurement quality, expected PRS resource configuration, a container for reporting the measurement values or positioning estimate, timestamp for measurement, and time window for a response.

The assisting UE 204-3 may initiate an assistance information request message to the anchor UE 204-1. The assisting UE 204-3 may perform the configured measurements on configured resources using the assistance information. After measurement or estimation, the assisting UE 204-3 may transmit the measurements as a response with provideLocationInformation message. The provideLocationInformation message may contain the measurements or estimate to be reported to the anchor UE 204-1. The assisting UE 204-3 may respond with the provideLocationInformation message within a predefined time window (before the timer expires).

The anchor UE 204-1 may receive provideLocationInformation message from the target UE 204-5 and the assisting UE 204-3 and may take appropriate action based on the message. If the provideLocationInformation message comprise measurements, then the anchor UE 204-1 may evoke an algorithm related to the configured method of positioning and may perform the positioning estimate. If the provideLocationInformation message comprise positioning estimate, the anchor UE 204-1 may validate the estimate with preconfigured integrity validation methods. The anchor UE 204-1 may forward the estimated position of the target UE 204-5 to the side-link application requesting the positioning.

The PRS may be transmitted in form of a side-link Synchronization Signal Block (SLSSB), a side-link Demodulation Reference Signal (DMRS), a side-link Channel State Information Reference Signal (CSI-RS), and a Sounding Reference Signal (SRS).

In one implementation, the anchor UE 204-1 may configure the target UE 204-5 and the assisting UE 204-3 with the SL-TDOA positioning method. The anchor UE 204-1 may configure the assisting UE 204-3 and the target UE 204-5 to receive the PRS over side-link in a complementary direction. The target UE 204-5 may receive at least one PRS sequence in a preconfigured PRS resource from the assisting UE 204-3. The target UE 204-5 may measure at least one of a reference signal time (RST), a reference time of arrival (RTOA), and a reference signal time difference (RSTD) based on the received PRS sequence. The RTOA may be a time period at which the reference signal is arrived at the target UE 204-5 with respect to pre-configured reference time. The RSTD may be a difference between RST of the assisting UE 204-3 and RST of reference assisting UE.

The target UE 204-5 may perform more than one measurement of RSTD/RST which may be corresponding to multiple paths including LOS paths and NLOS paths, same path but over different instances in time, group of clutters/paths, etc. the target UE 204-5 may measure an angle of arrival (AoA), Reference Signal Received Power (RSRP), line of sight (LOS) probability, and timestamp corresponding to each RSTD/RST. The target UE 204-5 may transmit one or measurement values to the anchor UE 204-1 using provideLocationInformation message.

In one aspect, the anchor UE 204-1 may configure the target UE 204-5 to transmit the PRS to the assisting UE 204-3. The assisting UE 204-3 may receive the PRS following the same procedure as the target UE 204-5 as mentioned in the above paragraph. The assisting UE 204-3 and the target UE 204-5 may expect assistance information from the anchor UE 204-1. The assistance information may include PCIs, GCIs, assisting UEID/TRP IDs of candidate assisting UEs or TRPs, reference UE/TRP node, PRS configuration of candidate corresponding to each assisting UE, QCL information with other RS from each assisting UE, the geographical coordinate of other assisting UEs or target UE, synchronization information with reference.

The anchor UE 204-1 may transmit a positioning request message to the assisting UE 204-3 and the target UE 204-5. The positioning request message may include information such as, measurement quantity (RSTD/RST) to measure, reporting quantities to be reported along with RSTD/RST e.g., RSRP, AoA, and LOS/NLOS probability, reporting configurations, time window, measurement expected window, etc. The assisting UE 204-03 and the target UE 204-5 may use information in the positioning request message to report measured RSTD/RST to the anchor UE 204-1. The measurement report may comprise at least measurement quantity (RSTD/RST), corresponding RSRP, AoA, and LOS/NLOS indicator, assumed reference UE ID, the integrity of measured RSTD/RST, used reference coordinates, positioning estimate, etc.

In one implementation, the anchor UE 204-1 may configure the target UE 204-5 and the assisting UE 204-3 with the SL-m-RTT positioning method. In this method, the position of the target UE 204-5 may be estimated based on the measurements performed at both the assisting UE 204-3 as well as the target UE 204-5.

The assisting UE 204-3 may transmit at least one first PRS sequence in a preconfigured PRS resource to the target UE 204-5 at a first time instant. The assisting UE 204-3 may receive at least one second PRS sequence from the target UE 204-5 at a second time instant. The assisting UE 204-3 may measure a difference between transmission time at the first time instant and reception time at the second time instant. The measurement may be performed over one or more transmission beams from the same UE (assisting or target) and can be over one or more channel paths. The assisting UE 204-3 may report the difference between the transmission time and the reception time to the anchor node 204-1 for determination of a round trip time (RTT) using provide LocationInformation configuration. The RTT may be determined in terms of at least one of a Rx-Tx time difference of arrival, a Rx-Rx time difference of arrival, and a Tx-Tx time difference of arrival The anchor UE 204-1 may perform positioning of the target UE 204-5 based on the difference between the transmission time and the reception time, QCL assumptions, Transmission-Reception beam pair hypothesis, and RSRP of the difference between the transmission time and the reception time. The anchor UE 204-1 may require PRS allocation information from the assisting UE 204-3 and the target UE 204-5. The anchor UE 204-1 may transmit a positioningInformationRequest message to the assisting UE 204-3 and the target UE 204-5. The target UE 204-5 may transmit the PRS configuration using a positioningInformationResponse message, which may include PRS type (SL-SSB, CSI-RS or SL-PRS), allocation resources in time and frequency, repetition count, sequence properties like initial value, cyclic shift or base sequence, the power offset with respect to a predefined transmission known to the anchor UE 204-1 and assisting UE 204-3 etc. The anchor UE 204-1 may configure the assisting UEs and target UE for performing RTT measurements using the response message.

In one implementation, the anchor UE 204-1 may configure the target UE 204-5 and the assisting UE 204-3 with the SL-AoA positioning method. In this method, the angle of arrival (AoA) may be measured by the target UE 204-5 and the assisting UE 204-3. The anchor UE 204-1 may configure the assisting UE 204-3 and the target UE 204-5 in complementary directions to receive the PRS over side-link.

The assisting UE 204-3 may transmit at least one PRS over predefined beams to the target UE 204-5. The assisting UE 204-3 may receive AoA measurement from the target UE 204-5 based on the at least one PRS. The AoA may be measured by the target UE 204-5 based on one or more taps in a power delay profile (PDP) estimation and antenna parameters. The antenna parameters may comprise antenna spacing, antenna pattern, beamwidth, and antenna power per element. The assisting UE 204-3 may report the received AoA measurement to the anchor UE 204-1. The anchor UE 204-1 may gather information using positioningInformationRequest and the assisting UE 204-3 and the target UE 204-5 may respond to requests with positioningInformationResponse.

In one implementation, the anchor UE 204-1 may configure the target UE 204-5 and the assisting UE 204-3 with the SL-AoD positioning method. In this method, the anchor UE 204-1 may measure the angle of departure by using measurements reported by the assisting UE 204-3 and the target UE 204-5. The measurements may be reported by either the assisting UE 204-3 or the target UE 204-5 based on the direction of transmission of PRS. The assisting UE 204-3 and the target UE 204-5 may be configured in a complementary direction to receive the PRS over side-link.

The assisting UE 204-3 may transmit at least one PRS over multiple beams to the target UE 204-5. One or more assisting UEs may sweep the spatial dimension in Zenith and Azimuth direction with redefined angles based on a number of antennas, antenna type, bore sight, beam width, and beamforming capability. The target UE 204-5 may receive at least one PRS configured and may perform power measurement over one or more paths. The target UE 204-5 may perform power measurement in terms of RSRP, RSSI, and/or SNR per beam per assisting UE. The target UE 204-5 may be configured to report associated AoA used for LoS confidence estimation. The target UE 204-5 may report back the one or more best beams using predefined criteria provided by the anchor UE 204-1. The anchor UE 204-1 may use the reported AoA to estimate the AoD. The target UE 204-5 may be configured with parameters related to the assisting UEs by the anchor UE 204-1. The parameter information may be gathered by the anchor UE 204-1 using positioningInformationRequest and the assisting UE 204-3 and the target UE 204-5 may respond to requests with positioningInformationResponse.

In one implementation, the anchor UE 204-1 may configure the target UE 204-5 and the assisting UE 204-3 with the CPP method. In this method, the target UE 204-5 and the assisting UE 204-3 may measure a carrier phase of the at least one PRS received over at least one of single sub carrier, multiple sub carrier, over a bandwidth part and a carrier bandwidth. The anchor UE 204-1 may gather information using positioningInformationRequest and the assisting UE 204-3 and the target UE 204-5 may respond to requests with positioningInformationResponse.

This application claims priority to Indian Patent Application number 202241013147, filed on Mar. 10, 2022, the subject matter of which is incorporated by reference.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of positioning a target node in a side-link communication system, the method comprising:

establishing, by at least one first node (204-1), a communication link with at least one target node (204-5), and at least one second node (204-3), for positioning the at least one target node (204-5);

transmitting, by the at least one first node (204-1), a capability request message to at least one of the at least one target node (204-5) and the at least one second node (204-3);

receiving, by the at least one first node (204-1), a feedback message from the at least one target node (204-5) and the at least one second node (204-3), wherein the feedback message comprises at least one of a capability reply message and an acceptance message;

configuring, by the at least one first node (204-1), the at least one second node (204-3) to one of transmit at least one Positioning Reference Signal (PRS) to the at least one target node (204-5) and receive the at least one PRS from the at least one target node (204-5), based on the feedback message, wherein the at least one PRS is utilized for determining a data related to at least one of position measurement and estimated positioning of the at least one target node (204-5); and receiving, by the at least one first node (204-1), a data related to at least one of a position measurement and estimated position of the at least one target node (204-5) used to estimate a position information, from at least one of the at least one target node (204-5) and the at least one second node (204-3), wherein the position information is at least one of the relative position, absolute position, directional ranging, and distance ranging of the at least one target node (204-5), wherein the relative position of the at least one target node (204-5) is estimated with respect to one of the at least one first node (204-1), the at least one second node (204-3) and node containing the sidelink positioning server, wherein the absolute position of the at least one target node (204-5) is estimated with respect to one of global coordinate system (GCS) and a local coordinate system (LCS) configured to the at least one target node (204-5), wherein the direction ranging is the direction of the at least one target node (204-5) with respective to one of the at least one first node (204-1), the at least one second node (204-3) and a node containing the sidelink positioning server;

wherein the distance ranging is the distance of the at least one target node (204-5) with respective to one of the at least one first node (204-1), the at least one second node (204-3) and the node containing the sidelink positioning server;

wherein the position information is at least one of the relative position, absolute position, directional ranging, and distance ranging of the at least one target node (204-5);

wherein the relative position of the at least one target node (204-5) is estimated with respect to one of the at least one first node (204-1), the at least one second node (204-3) and node containing the sidelink positioning server;

wherein the absolute position of the at least one target node (204-5) is estimated with respect to one of global coordinate system (GCS) and a local coordinate system (LCS) configured to the at least one target node (204-5);

wherein the direction ranging is the direction of the at least one target node (204-5) with respective to one of the at least one first node (204-1), the at least one second node (204-3) and a node containing the sidelink positioning server; and wherein the distance ranging is the distance of the at least one target node (204-5) with respective to one of the at least one first node (204-1), the at least one second node (204-3) and the node containing the sidelink positioning server.

2. The method as claimed in claim 1, wherein prior to establishing the communication link by the at least one first node (204-1), the method further comprises:

receiving, by the at least one first node (204-1), a request from one of the at least one second node (204-3), the at least one target node (204-5), a Location Request Control Unit (LRCU), external application connected to the at least one first node (204-1), a sidelink positioning server and a Location Management Function (LMF), for establishing the communication link.

3. The method as claimed in claim 2, wherein the sidelink positioning server performs a subset of the functionalities of the LMF.

4. The method as claimed in claim 1, further comprising:

estimating, by the at least one first node (204-1), the position information of the at least one target node (204-5) based on the data related to the position measurement; and transmitting, by the at least one first node (204-1), the position information of the at least one target node (204-5) to at least one of the LRCU, the LMF, the at least one target node (204-5), and the at least one second node (204-3).

5. The method as claimed in claim 1, wherein receiving by at least one first node (204-1), the data related to estimated position of the at least one target node (204-5) further comprises:

transferring, by the at least one first node (204-1), the estimated position of the at least one target node (204-5) to a LMF via an Access and Mobility Management Function (AMF).

6. The method as claimed in claim 1, further comprising:

transferring, by the at least one first node (204-1), the data related to the position measurement of the at least one target node (204-5) to a LMF; and estimating, by the LMF, the position information of the at least one target node (204-5).

7. The method as claimed in claim 1, further comprising:

transferring, by the at least one first node (204-1), the estimated position to a sidelink positioning server via the LRCU when the at least one first node (204-1), the at least one second node (204-3) and the at least one target node (204-5) are not connected to at least one base station (BS).

8. The method as claimed in claim 2, wherein at least one of the at least one first node (204-1), the at least one second node (204-3), and the at least one target node (204-5) performs the functionality of sidelink positioning server and the LRCU.

9. The method as claimed in claim 1, wherein the capability reply message comprises at least one of message segmentation capability, PRS processing capability, maximum frequency layer supported, side-link band combination supported, supported bandwidth, supported Sub-Carrier Spacing (SCS), PRS processing duration, maximum PRS configuration can be handled, FR1/FR2 support, PRS buffer types, a list of the at least one second node, and Quasi Co Location (QCL) capabilities.

10. The method as claimed in claim 1, wherein receiving, by the at least one first node (204-1), the feedback message from the at least one second node (204-3) further comprises:

deciding by the at least one first node and the at least one second node for the position measurement of the at least one target node (204-5), and wherein the feedback message further comprises at least one of overlapping positioning capabilities, link quality, signal strength, relative or absolute location of the node, battery life of node, node type, node power class, and node security criteria, and PC5 capability.

11. The method as claimed in claim 10, wherein the at least one second node (204-3) is decided from a list of assisting nodes received from at least one of the at least one target node (204-5), the external application, the positioning server, and LCRU.

12. The method as claimed in claim 1, wherein configuring, by the at least one first node (204-1), the at least one target node (204-5) and the at least one second node (204-3) further comprises performing the position measurement based on an assistance information, and wherein the assistance information comprises physical cell IDs (PCIs), global cell IDs (GCIs), second node IDs, reference node, second node locations, local positioning reference, global positioning reference, synchronization offsets between the at least one target node (204-5) and at least one second node (204-3), set of PRS configurations, set of reporting configurations, periodic or aperiodic measurement reporting information, trigger for measurements, time window for measurement, time stamp of the measurement, and integrity protection parameter for measurements.

13. The method as claimed in claim 1, wherein configuring, by the at least one first node (204-1) further comprises:

transmitting, by the at least one first node (204-1), a location information request to the at least one target node (204-5) and the at least one second node (204-3), wherein the location information request comprises measurement quality, expected PRS resource configuration, a container for reporting the measurement values or positioning estimate, timestamp for measurement, and time window for a response.

14. The method as claimed in claim 13, further comprises receiving by the at least one first node, a positioning measurement from at least one of the at least one target node (204-5) and the at least one second node (204-3) in response to the location information request;

wherein the positioning measurement comprises the data related to at least one of the position measurement and the estimated position of the at least one target node (204-5).

15. The method as claimed in claim 1, wherein the at least one PRS is at least one of side-link Synchronization Signal Block (SL-SSB), side-link Demodulation Reference Signal (DMRS), side-link Channel State Information Reference Signal (CSI-RS), and Sounding Reference Signal (SRS).

16. The method as claimed in claim 1, wherein the positioning is performed using at least one of a side-link time difference of arrival (SL-TDOA) positioning method, a side-link multiple round trip time (SL-m-RTT) positioning method, a side-link angle of arrival (SL-AoA) positioning method, a side-link angle of departure (SL-AoD) positioning method, carrier phased based positioning (CPP) method, zone ID, and assisted Global Navigation Satellite System (GNSS) positioning method.

17. The method as claimed in claim 16, wherein the SL-TDOA positioning method comprises:
measuring, by at least one of the at least one target node (204-5) and at least one second node (204-3), at least one of a reference signal time (RST), a reference time of arrival (RTOA), and reference signal time difference (RSTD) based on the at least one PRS sequence.

18. The method as claimed in claim 17, wherein the RSTD is a difference between RST of the at least one second node (204-3) and RST of the at least one target node (204-5) and wherein the RTOA is a difference between RST and a reference time pre-configured.

19. The method as claimed in claim 17, wherein the at least one target node (204-5) measures at least one of an angle of arrival (AoA), Reference Signal Received Power (RSRP), line of sight (LOS) probability, and timestamp corresponding to each RSTD/RST.

20. The method as claimed in claim 16, wherein the SL-m-RTT positioning method comprises:
transmitting, by the at least one second node (204-3), at least one first PRS sequence in a preconfigured PRS resource to the at least one target node (204-5) at a first time instant;
receiving, by the at least one second node (204-3), at least one second PRS sequence from the target node at a second time instant; and
measuring, by at least one of the at least one target node (204-5) and the at least one second node (204-3), a difference between transmission time at the first time instant and reception time at the second time instant for determination of a Round Trip Time (RTT) in terms of at least one of a Rx-Tx time difference of arrival, a Rx-Rx time difference of arrival, and a Tx-Tx time difference of arrival.

21. The method as claimed in claim 20, wherein the at least one first node (204-1) performs positioning of the at least one target node (204-5) based on the difference between the transmission time and the reception time, QCL assumptions, Transmission-Reception beam pair hypothesis, and RSRP of the difference between the transmission time and the reception time.

22. The method as claimed in claim 16, wherein the AoA is measured by at least one of the at least one at least one target node (204-5) and at least one second node based on at least one tap in a power delay profile (PDP) estimation and antenna parameters.

23. The method as claimed in claim 22, wherein the antenna parameters comprise at least one of antenna spacing, antenna pattern, beamwidth, and antenna power per element.

24. The method as claimed in claim 16, wherein the SL-AoD positioning method comprises: power measurement from at least one of the at least one target node (204-5) and at least one second node (204-3) over at least one PRS transmitted using at least one beam, wherein the power measurement is performed based on Reference Signal Received Power (RSRP), Received Signal Strength Indicator (RSSI), and Signal to Noise Ratio (SNR).

25. The method as claimed in claim 23, wherein at least one of the at least one target node (204-5) and at least one second node (204-3) sweeps a spatial dimension in Zenith and Azimuth direction with redefined angles based on at least one of a number of antennas, antenna type, bore sight, beam width, and beamforming capability.

26. The method as claimed in claim 16, wherein the at least one second node (204-3) and at least one target node (204-5) are configured in a complementary direction to receive the PRS over side-link.

27. The method as claimed in claim 16, wherein the CPP positioning method comprises:
measuring, by at least one of the at least one target node (204-5) and the at least one second node (204-3), a carrier phase of the at least one PRS received over at least one of single sub carrier, multiple sub carrier, over a bandwidth part and a carrier bandwidth.

28. The method as claimed in claim 1, wherein the at least one first node (204-1) is configured to one of transmit the at least one PRS to the at least one target node (204-5) and receive the at least one PRS from the at least one target node (204-5) and acquire the data related to at least one of the position measurement and the estimated position of the at least one target node (204-5).

29. A method of positioning a target node in a side-link communication system, the method comprising:
transmitting, by at least one target node (204-5), a request for position measurement to at least one first node (204-1);
performing one of:
receiving, by the at least one target node (204-5), at least one Positioning Reference Signal (PRS) from at least one of the at least one first node (204-1) and at least one second node (204-3);
transmitting, by the at least one target node (204-5), the at least one PRS to one of the at least one first node (204-1) and at least one second node (204-3), wherein the at least one second node (204-3) is selected from a list of assisting nodes; and
estimating, by the at least one target node (204-5), a data related to at least one of position measurement and estimated positioning based on the at least one PRS;
wherein the at least one of position measurement and estimated positioning is performed using at least one of a side-link time difference of arrival (SL-TDOA) positioning method, a side-link multiple round trip time (SL-m-RTT) positioning method, a side-link angle of arrival (SL-AoA) positioning method, a side-link angle of departure (SL-AoD) positioning method, zone ID, carrier phase based positioning (CPP) method and assisted Global Navigation Satellite System (GNSS) positioning method.

30. The method as claimed in claim 29, wherein the list of assisting nodes are capable of performing position measurement of the at least one target node (204-5).

31. The method as claimed in claim 29, further comprising transmitting, by the at least one target node (204-5), the data related to at least one of position measurement and estimated positioning to at least one of a sidelink positioning server, the at least one first node and at least one second node.

32. The method as claimed in claim 31, wherein the least one of the at least one first node (204-1) and at least one second node (204-3) transfers the data related to the at least one of position measurement and the estimated positioning to the sidelink positioning server.

33. The method as claimed in claim 29, wherein the data related to at least one of position measurement and estimated positioning is transmitted to a Location Management Function (LMF) via an Access and Mobility Management Function (AMF).

34. The method as claimed in claim 29, wherein the data related to at least one of position measurement and estimated positioning is transmitted to a Location Request Control Unit (LRCU) when the at least one first node (204-1), the at least one second node (204-3) and the at least one target node (204-5) are not connected to at least one base station (BS).

35. The method as claimed in claim 29, wherein the at least one PRS is at least one of side-link Synchronization Signal Block (SL-SSB), side-link Demodulation Reference Signal (DMRS), side-link Channel State Information Reference Signal (CSI-RS), and Sounding Reference Signal (SRS).

36. The method as claimed in claim 29, wherein the SL-TDOA positioning method comprises:
measuring, by at least one of the at least one target node (204-5) and at least one second node (204-3), at least one of a Reference Signal Time (RST) a reference time of arrival (RTOA) and Reference Signal Time Difference (RSTD) based on the at least one PRS sequence.

37. The method as claimed in claim 36, wherein the RSTD is a difference between RST of the at least one second node (204-3) and RST of the at least one target node (204-5) and wherein the RTOA is a difference between RST and a reference time pre-configured.

38. The method as claimed in claim 36, wherein the at least one target node (204-5) measures at least one of an angle of arrival (AoA), Reference Signal Received Power (RSRP), line of sight (LOS) probability, and timestamp corresponding to each RSTD/RST.

39. The method as claimed in claim 29, wherein the SL-m-RTT positioning method comprises:
transmitting, by the at least one second node (204-3), at least one first PRS sequence in a preconfigured PRS resource to the at least one target node (204-5) at a first time instant;
receiving, by the at least one second node (204-3), at least one second PRS sequence from the target node at a second time instant; and
measuring, by at least one of the at least one target node (204-5) and the at least one second node (204-3), a difference between transmission time at the first time instant and reception time at the second time instant for determination of a Round Trip Time (RTT) in terms of at least one of a Rx-Tx time difference of arrival and a Rx-Rx time difference of arrival and a Tx-Tx time difference of arrival.

40. The method as claimed in claim 39, wherein the at least one first node (204-1) performs positioning of the at least one target node (204-5) based on the difference between the transmission time and the reception time, QCL assumptions, Transmission-Reception beam pair hypothesis, and RSRP of the difference between the transmission time and the reception time.

41. The method as claimed in claim 29, wherein the AoA is measured by at least one of the at least one at least one target node (204-5) and at least one second node based on at least one tap in a power delay profile (PDP) estimation and antenna parameters.

42. The method as claimed in claim 41, wherein the antenna parameters comprise at least one of antenna spacing, antenna pattern, beamwidth, and antenna power per element.

43. The method as claimed in claim 42, wherein the SL-AoD positioning method comprises:
performing power measurement from at least one of the at least one target node (204-5) and at least one second node (204-3) over at least one PRS transmitted over at least one beam, wherein the power measurement is performed based on Reference Signal Received Power (RSRP), Received Signal Strength Indicator (RSSI), and Signal to Noise Ratio (SNR).

44. The method as claimed in claim 43, wherein at least one of the at least one target node (204-5) and at least one second node (204-3) sweeps a spatial dimension in Zenith and Azimuth direction with redefined angles based on at least one of a number of antennas, antenna type, bore sight, beam width, and beamforming capability.

45. The method as claimed in claim 29, wherein the at least one second node (204-3) and at least one target node (204-5) are configured in a complementary direction to receive the PRS over side-link.

46. The method as claimed in claim 29, wherein the CPP positioning method comprises:
measuring, by at least one of the at least one target node (204-5) and the at least one second node (204-3), a carrier phase of the at least one PRS received over at least one of single sub carrier, multiple sub carrier, over a bandwidth part and a carrier bandwidth.

* * * * *